United States Patent
Travostino et al.

(10) Patent No.: US 6,957,438 B1
(45) Date of Patent: Oct. 18, 2005

(54) NETWORK DEVICE APPLICATION PROGRAMMING INTERFACE

(75) Inventors: Franco Travostino, Arlington, MA (US); Bradley Cain, Cambridge, MA (US)

(73) Assignee: Nortel Networks Limited, (CA)

( * ) Notice: Subject to any disclaimer, the term of this patent is extended or adjusted under 35 U.S.C. 154(b) by 0 days.

(21) Appl. No.: 09/536,078

(22) Filed: Mar. 24, 2000

Related U.S. Application Data

(60) Provisional application No. 60/126,460, filed on Mar. 26, 1999.

(51) Int. Cl.[7] .............................. G06F 3/00; G06F 9/44; G06F 9/46; G06F 13/00
(52) U.S. Cl. ........................................ 719/328; 709/238
(58) Field of Search ................................ 709/328, 227, 709/230, 232, 237, 243, 246, 238; 719/328

(56) References Cited

U.S. PATENT DOCUMENTS

| | | | | |
|---|---|---|---|---|
| 5,329,619 | A | * 7/1994 | Page et al. | ................... 709/203 |
| 5,509,123 | A | 4/1996 | Dobbins et al. | ....... 395/200.15 |
| 5,619,650 | A | 4/1997 | Bach et al. | ............ 395/200.01 |
| 5,983,274 | A | * 11/1999 | Hyder et al. | ................ 709/230 |
| 6,148,349 | A | * 11/2000 | Chow et al. | .................. 710/33 |
| 6,324,583 | B1 | * 11/2001 | Stevens | ....................... 709/230 |
| 6,442,612 | B1 | * 8/2002 | Hugosson et al. | .......... 709/230 |
| 6,754,219 | B1 | * 6/2004 | Cain et al. | ................... 370/401 |
| 6,810,409 | B1 | * 10/2004 | Fry et al. | ..................... 709/202 |

OTHER PUBLICATIONS

"Notes on Writing Portable Programs in C," Dolenc et al., Nov. 1990, 8th Revision, Mar. 3, 1995.
"A Survey of Active Network Research," Tennehouse et al., Jan. 1997, IEEE Communications Magazine vol. 35, No. 1, 1997, pp. 80-86.

* cited by examiner

*Primary Examiner*—Meng-Al T An
*Assistant Examiner*—George L Opie
(74) *Attorney, Agent, or Firm*—Steubing McGuinness & Manaras LLP

(57) ABSTRACT

An application programming interface for use in a network device includes at least one control module that is capable of controlling a forwarding plane of the network device. In particular, the network device forwards packets across a network, and includes the forward plane for processing data packets. The application programming interface includes an input module that receives function calls, at least one control module (mentioned above) that receives input control data via the function calls, and an output module that forwards output control data from the control module. The control module produces the output control data based upon the input control data. The output control data is capable of controlling execution of the forwarding plane.

25 Claims, 6 Drawing Sheets

NETWORK DEVICE APPLICATION PROGRAMMING INTERFACE

PRIORITY

This U.S. patent application claims priority from U.S. provisional patent application Ser. No. 60/126,460, filed on Mar. 26, 1999, and entitled, "JFWD: CONTROLLING THE FORWARDING PLANE OF SWITCHES AND ROUTERS THROUGH A NEW JAVA API," the disclosure of which is incorporated herein, in its entirety, by reference.

CROSS REFERENCES TO RELATED APPLICATIONS

This patent application may include related subject matter to the following commonly-owned United States patent applications, each of which is incorporated in its entirety by reference:

U.S. patent application Ser. No. 09/326,733 and entitled MODULAR ROUTING SYSTEM, now U.S. Pat. No. 6,754,219;

U.S. patent application Ser. No. 09/326,022 and entitled APPARATUS AND METHOD FOR MANAGING COMMUNICATION BETWEEN A FAILED APPLICATION AND OTHER EXECUTING APPLICATIONS, now U.S. Pat. No. 6,757,289;

U.S. patent application Ser. No. 09/326,021 and entitled APPARATUS AND METHOD FOR FORWARDING MESSAGES BETWEEN TWO APPLICATIONS;

U.S. patent application Ser. No. 09/326,035 and entitled APPARATUS AND METHOD FOR ESTABLISHING COMMUNICATIONS BETWEEN APPLICATIONS;

U.S. patent application Ser. No. 09/326,099 and entitled APPARATUS AND METHOD FOR CREATING BYPASS PATHS BETWEEN APPLICATIONS, now abandoned;

U.S. patent application Ser. No. 09/326,007 and entitled THREAD MEMORY RECLAMATION, now U.S. Pat. No. 6,842,901;

U.S. patent application Ser. No. 09/326,019 and entitled APPARATUS AND METHOD FOR MONITORING MESSAGES FORWARDED BETWEEN APPLICATIONS;

U.S. patent application Ser. No. 09/326,238 and entitled APPARATUS AND METHOD OF MANAGING AND CONFIGURING A NETWORK DEVICE, now abandoned; and U.S. patent application Ser. No. 09/325,892 and entitled ROUTER TABLE MANAGER, now U.S. Pat. No. 6,810,427.

FIELD OF THE INVENTION

The invention generally relates to network devices and, more particularly, the invention relates to controlling the forwarding plane in a network device.

BACKGROUND OF THE INVENTION

Many networks, such as the Internet, utilize a multitude of data forwarding devices (e.g., routers and switches) to forward data messages, such as data packets, between network nodes. Among other things, such forwarding devices include both routing software and a corresponding routing hardware platform that cooperate to forward data messages to their appropriate destinations.

Undesirably, routing software within current forwarding devices generally is preconfigured for use within one specific routing hardware platform only. In particular, a forwarding device (e.g., a router) manufactured by a given vendor has routing software that is specifically coded and configured for use with no routing hardware platform other than that of the given vendor. Accordingly, such routing software from one vendor cannot be used on another vendor's forwarding device.

SUMMARY OF THE INVENTION

In accordance with one aspect of the invention, an application programming interface for use in a network device includes at least one control module that is capable of controlling a forwarding plane of the network device. In particular, the network device forwards packets across a network, and includes the forwarding plane for processing data packets. The application programming interface includes an input module that receives function calls, at least one control module (mentioned above) that receives input control data via the function calls, and an output module that forwards output control data from the control module. The control module produces the output control data based upon the input control data. The output control data is capable of controlling execution of the forwarding plane.

In some embodiments, the control module includes a plurality of objects arranged in a hierarchical tree structure. The function calls instantiate at least one of the objects for storing the output control data in a memory device. In various embodiments, the at least one control module ("control module") may execute one of a plurality of different functions. For example, the control module may be a region module that identifies a specified amount of memory for storing the output control data. In other embodiments, the control module may be a mapping module that specifies units of the output control data for storage in memory. In addition, the control module may be a read handler module that permits output control data to be read from memory by an application program, or a write handler module that permits the output control data to be written to memory by an application program. The write handler module may permit output control data to be modified in memory by the application program. Among other things, the network device may be a router.

In accordance with another aspect of the invention, an application programming interface for use with a network device that forwards data packets across a network includes a hierarchical tree of objects that control execution of a forwarding plane that is included in the network device. Each of the objects are responsive to function calls from an application program. In addition, each of the objects produce control data to control execution of the forwarding plane. The produced control data is based upon data in the function calls.

In accordance with yet another aspect of the invention, a network device having a forwarding plane includes a processor for executing an application program, and an application programming interface having a control module that controls the forwarding plane in response to at least one function call from the application program. In a similar manner to other aspects, the forwarding plane processes data packets for forwarding across a network.

In accordance with still other aspects of the invention, an application programming interface for use in a network device that forwards data across a network includes a control module and a management module. The network device includes a forwarding plane that is controlled by the control module and the management module. In particular, the control module receives control data from an application program for use by the forwarding plane. The forwarding plane consequently processes data packets as specified by the control data. The management module receives management data for managing the forwarding plane.

Some embodiments of the invention are implemented as a computer program product having a computer usable medium with computer readable program code thereon. The computer readable code may be read and utilized by a computer system in accordance with conventional processes.

BRIEF DESCRIPTION OF THE FIGURES

The foregoing and advantages of the invention will be appreciated more fully from the following further description thereof with reference to the accompanying drawings wherein.

DESCRIPTION OF ILLUSTRATIVE EMBODIMENTS

Figure 1:
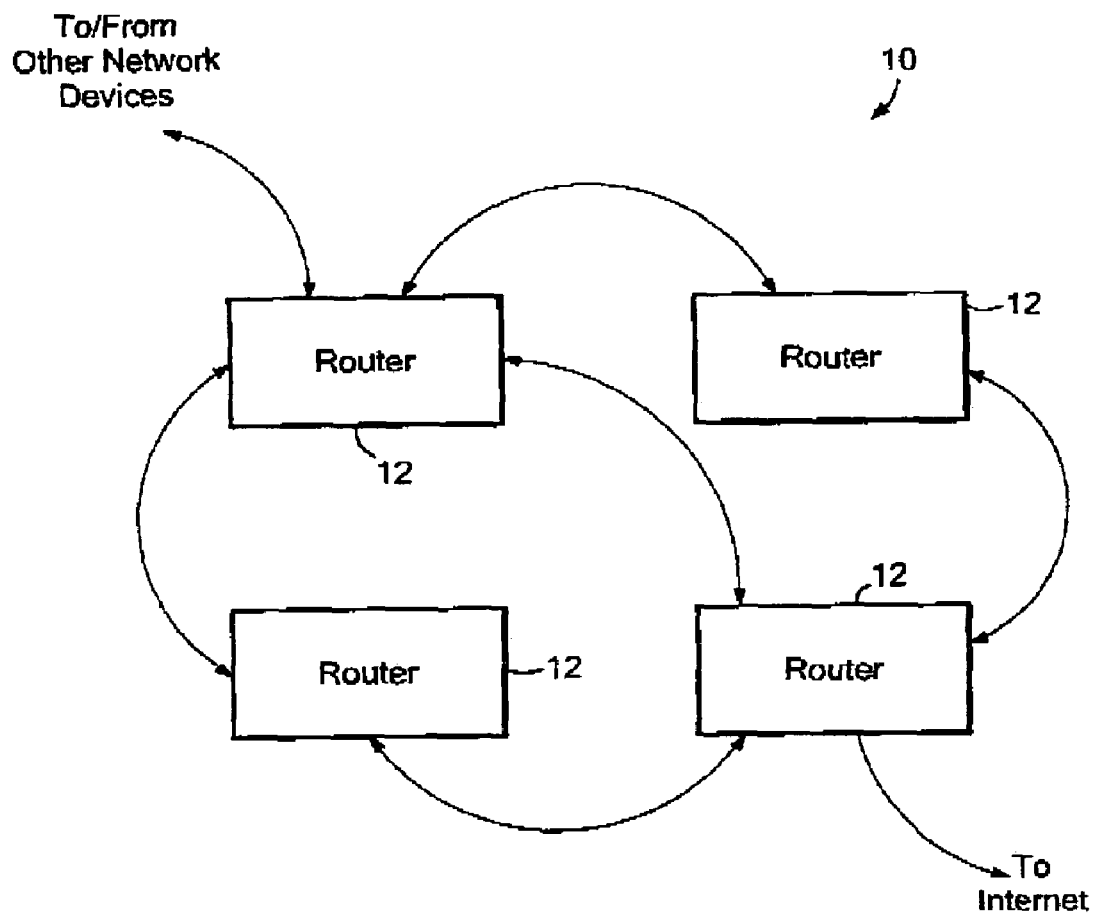
FIG. 1 schematically shows an exemplary network arrangement in which preferred embodiments of the invention may be implemented.

FIG. 1 schematically shows an exemplary network arrangement 10 in which preferred embodiments of the invention may be implemented. The network includes a plurality of network devices that cooperate to transmit data messages across the network. In the example shown, the network devices are routers (identified by reference number 12).

Among other uses, each router 12 may be coupled to one or more smaller networks, such as a local area network, and/or may be utilized solely to forward received data messages (e.g., Internet Protocol packets). Moreover, each router 12 preferably supports more than one data routing protocol and thus, may be coupled with smaller networks that utilize different protocols. For example, one router 12 coupled with the Internet may be coupled to a smaller network that utilizes Asynchronous Transfer Mode ("ATM"). Accordingly, such router 12 includes data routing software to route data messages utilizing either ATM or the Internet Protocol ("IP"). In preferred embodiments, this router 12 includes software that can implement a variety of other routing protocols, such as the Point-to-Point protocol ("PPP").

It should be noted that although only four are shown, the network may include many more routers 12. In addition, routers 12 are discussed herein as exemplary network devices. Those skilled in the art should appreciate that preferred embodiments may be applied to other network devices that forward data messages between other network devices. For example, principles of the invention may be applied to network switches, network bridges, and firewalls. Accordingly, discussion of specific network hardware (e.g., routers 12), specific data transfer protocols (e.g., IP, ATM, VLAN, etc . . . ), and specific operating systems (e.g., WINDOWS or Disk Operating System) is for exemplary purposes only and is not intended to limit the scope of preferred embodiments of the invention.

Figure 2:
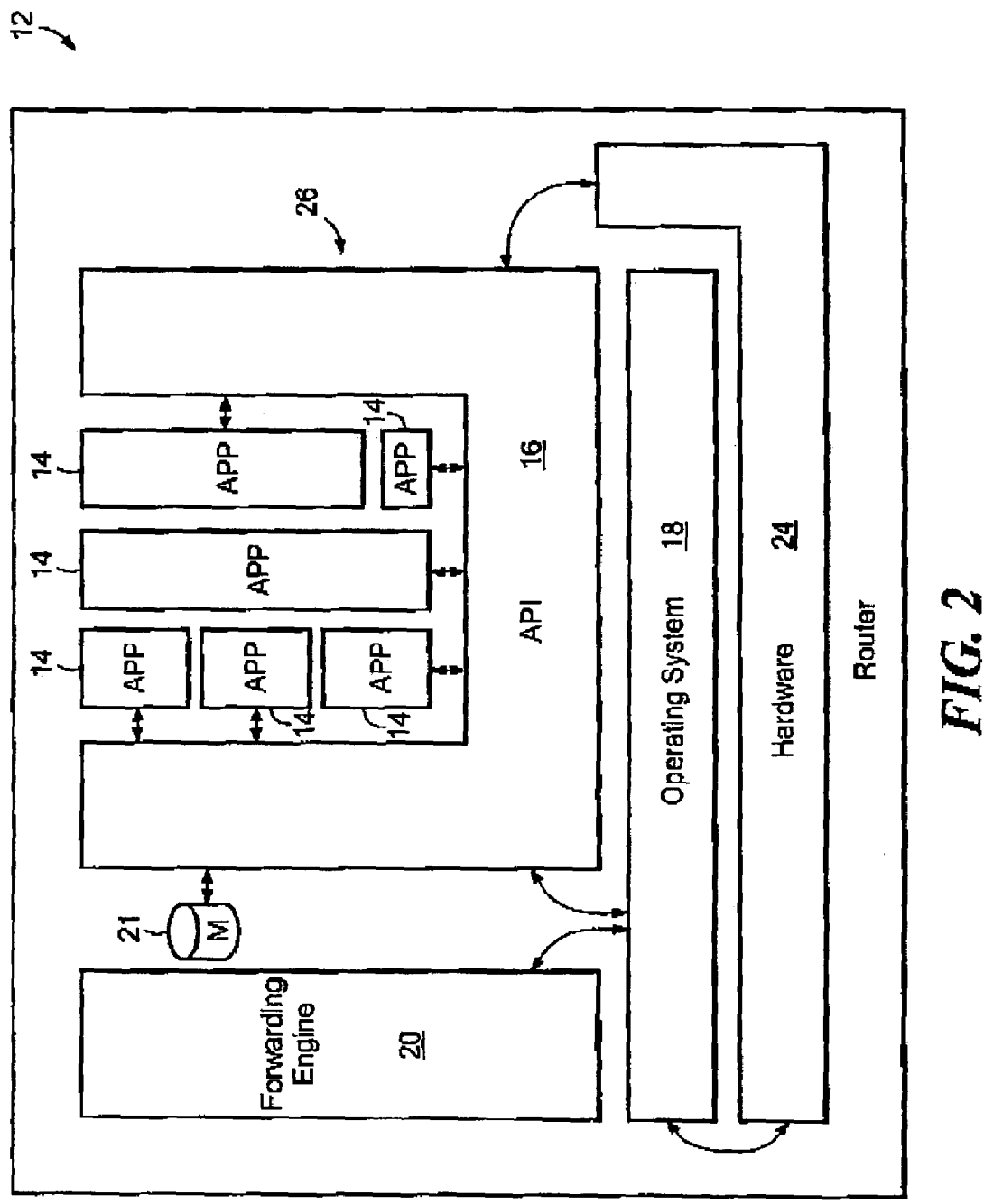
FIG. 2 schematically shows a router configured in accord with preferred embodiments of the invention.

In accord with preferred embodiments, routing application programs (a/k/a "routing software") intended for use within a plurality of disparate routing hardware platforms are configured to produce messages that comply with a prescribed standard routing application program interface ("routing API 16", see FIG. 2). More particularly, routing software (e.g., implementing IP, ATM, or router table management, etc . . . ) may be written by any software vendor for use on any vendor's routing platform that utilizes the preferred routing API 16. Accordingly, a single routing application program (i.e., a set of application programs specifying a protocol, and supporting and managing a router 12 utilizing the specific routing protocol) may be loaded into any such vendor's routing platform without the need for it to be specifically configured to the underlying routing platform.

To that end, as suggested above, the routing software generates control data messages (also referred to below as "function calls") that are forwarded to the router API 16. Each received message is formatted in accord with a preselected standard that is recognizable by the router API 16. Upon receipt, the router API 16 processes each received standard command, and generates platform specific control messages that control the underlying routing platform. For example, a routing table application program may forward a control data message to the API 16 with table data to update a routing table. The API 16 responsively extracts the table data from the control data message, and then updates the routing table accordingly. Details of this process are discussed below.

FIG. 2 schematically shows an exemplary router 12 configured in accord with preferred embodiments of the invention. The router 12 includes a plurality of routing application programs 14, a single routing API 16 that translates standard commands from the application programs 14 to platform specific commands, an operating system 18, a forwarding engine (referred to herein as the "forwarding plane 20") for managing transmission and receipt of data messages from the network, memory 21 for storing control data, and routing hardware 24 (e.g., memory, drives, processors, ports, etc . . . ). Each of these elements of the router 12 communicate via the shown arrows.

In preferred embodiments, the application programs 14 and routing API 16 are considered to be in the "control plane 26" (a/k/a the "control engine 26") of the router 12. As known in the art, the control plane 26 includes upper layer software used for a variety of functions, such as route calculation, signaling, and management. In general, the control plane 26 controls the forwarding plane 20 by configuring it upon initialization, and updating it as necessary after initialization. For example, the control plane 26 may initialize a routing table that is accessed by the forwarding plane 20 for forwarding data messages. There are instances, however, when the control plane 26 performs functions normally performed by the forwarding plane 20. For example, data messages that the forwarding plane 20 cannot process may be sent to the control engine for forwarding.

The forwarding plane 20 preferably is the lower-layer forwarding path that is responsible for packet inspection, destination lookup, output delivery, and statistics gathering in the router 12. In some embodiments, the forwarding plane 20 is a combination of application specific integrated circuits ("ASICs") and low-level software designed for a specific platform (e.g., firmware). Examples of forwarding plane functions include layer-2/layer-3 hardware assisted lookup functions, queuing systems, and switch fabric elements.

Figure 3:
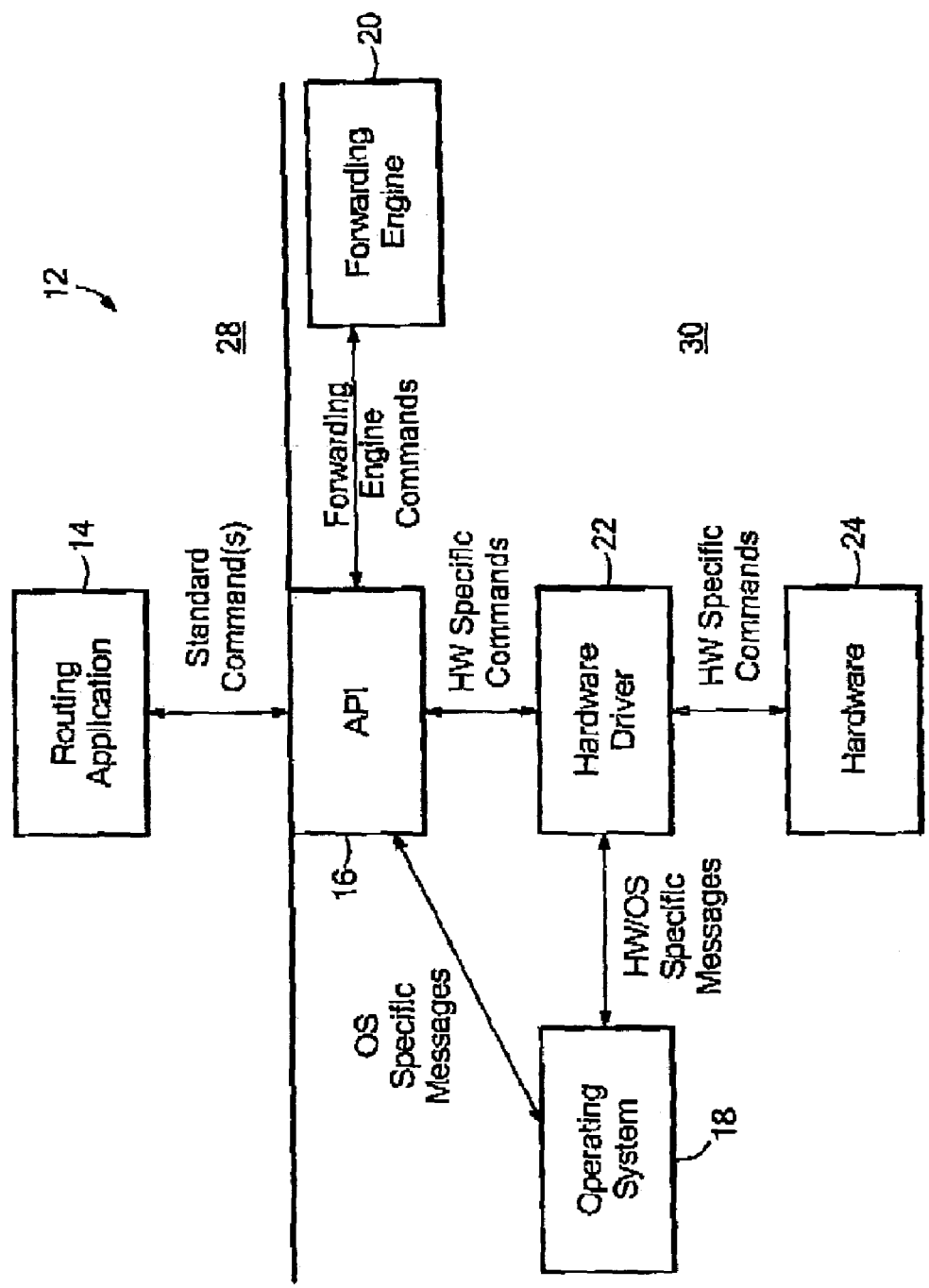
FIG. 3 schematically shows another representation of the router shown in FIG. 2.

FIG. 3 shows another schematic representation of the router 12 shown in FIG. 2, in which the router 12 is divided into a standard command region 28, and a platform specific region 30. In particular, the application programs 14 forward standard commands to the routing API 16 within the standard command region 28. In response, the routing API 16 forwards router platform specific commands to various parts of the router 12. Specifically, the routing API 16 forwards platform specific commands to the operating system 18 (i.e., operating system specific commands), the hardware drivers 22, and the forwarding engine 20. The hardware driver 22 responsively forwards further platform specific commands to the hardware 24. In a similar manner, the operating system 18 also may forward platform specific commands to the hardware drivers 22. Accordingly, as noted above, the API 16 is customized to receive standard commands from application programs 14, and translate such standard commands (e.g., operating system commands, driver commands, etc . . . ) into the format required by the underlying routing platform. Details of the interaction between the API 16 and the operating system 18 and hardware driver 22 are discussed in greater detail in the above noted cross-referenced patent applications that are incorporated into this patent application ("incorporated applications"). Details of the interaction of the API 16 and the forwarding engine 20 are discussed below.

It should be noted that the incorporated patents refer to a "mapper" that is utilized by the API 16 for communicating with the forwarding engine 20. In the embodiments shown herein, however, the mapper is integrated into the API 16 to communicate with the forwarding engine 20. Accordingly, the incorporated applications merely discuss an embodiment of the invention in which the mapper is schematically separated from the API 16. Those skilled in the art should understand, however, that principles of this disclosure and those disclosures can be utilized to practice various embodiments of the invention.

Figure 4:
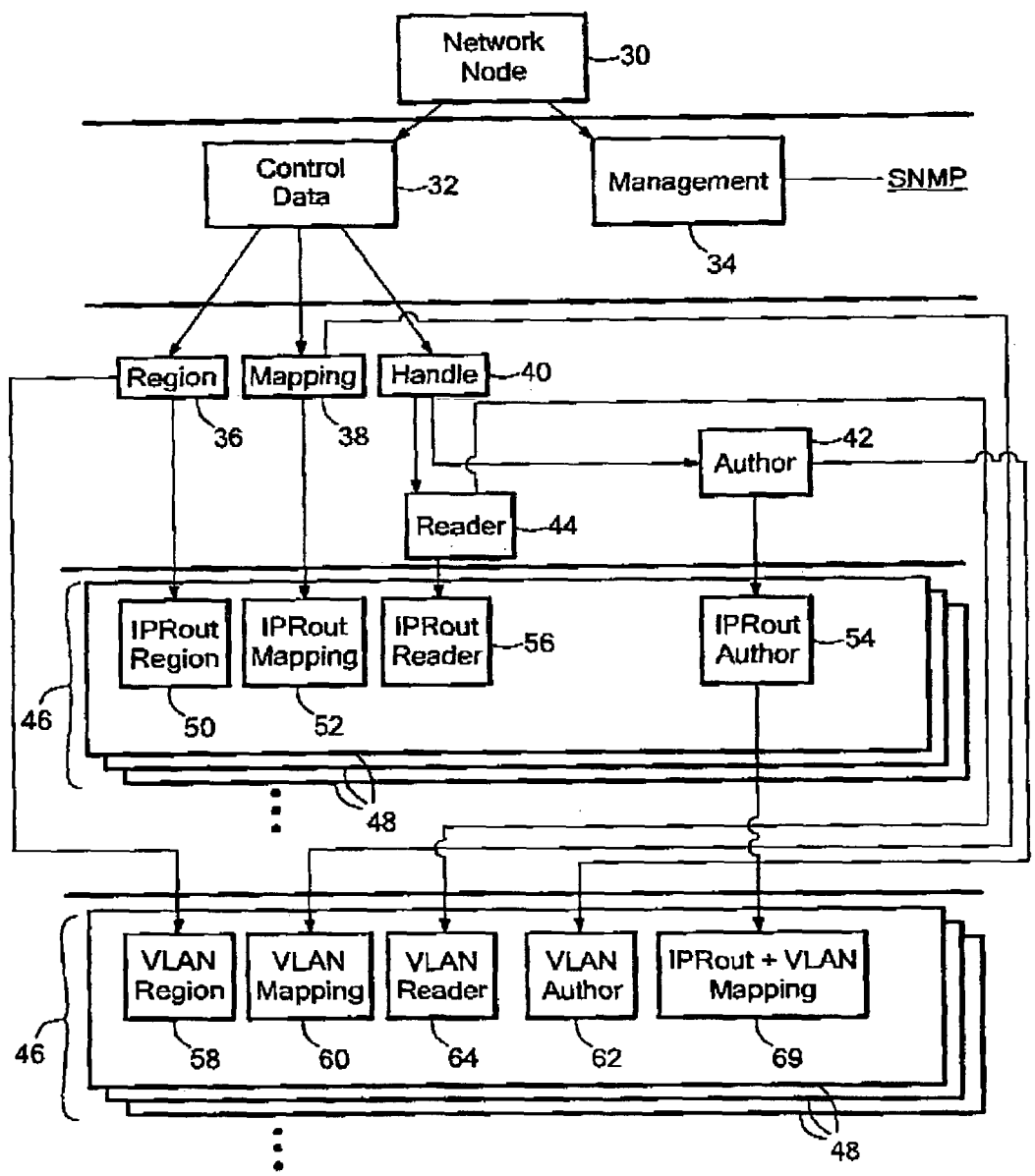
FIG. 4 schematically shows a tree structure that may be utilized to implement an application programming interface in accordance with preferred embodiments of the invention.

The API 16 may be implemented in any manner known in the art. FIG. 4 shows one exemplary implementation of the API 16. In particular, FIG. 4 schematically shows a tree structure that may be utilized to implement the API 16. In illustrative embodiments, the tree structure is a plurality of objects that are configured in accordance with conventional object oriented programming techniques. Use of an object oriented model provides a number of advantages, such as the potential to easily increase and/or modify the overall functionality of the API 16. This concept commonly is referred to as "extensibility."

The objects at the root of the tree are the most general objects, while those at the leaves of the tree are the most specific. It should be noted that each node is shown on the tree as being one object. This is not intended to mean that only one object can be utilized for each node. Accordingly, although shown schematically as one object, each object shown in the tree may include a plurality of objects to effectuate the underlying function. Since the tree shown in FIG. 4 is constructed as a tree of objects, well known object oriented programming principles therefore apply, such as inheritance, encapsulation, and polymorphism. Specifically, in this context, inheritance relates to control data units stored in memory deriving from an abstract root data unit. Furthermore, in this context, encapsulation relates to control data units that can be modified through exported interfaces only. The inner fields of objects are hidden to application programs 14 utilizing the tree. Finally, polymorphism relates to dynamic method resolutions that permit application programs 14 to manipulate stored data units as either specific data units (i.e., leaves on the tree), or as generic, abstract data units (i.e., as root objects on the tree).

As known in the art, each of the objects in the tree are based upon underlying class code. When in use, an application program 14 retrieves the appropriate objects at the level of abstraction that is necessary to effectuate the desired function. Details of this process are discussed below.

The root object of the tree is a network node object 30, which includes basic hardware information relating to the underlying router 12. For example, such information may include the manufacturer of the router 12, the router serial number, and other physical characteristics of the router 12. The next level of abstraction after the network node object 30 is divided between a control data object 32 that controls flow of control data between the control plane 20 and the forwarding plane 26, and a management object 34 that manages the router 12.

The management object 34 manages the router 12 in accord with conventional processes. For example, by utilizing the management object, a system administrator may monitor and/or control various facets of the router 12. The management object 34 preferably utilizes the well known Simple Network Management Protocol ("SNMP") to control management processes via a management information base (known in the art as a "MIB"). One such implementation of SNMP is distributed under the trade name "EMANATE™", which is distributed by SNMP Research International, Inc. of Knoxville, Tenn. As known in the art, EMANATE™ operates in conjunction with a management agent to support remote management operations (e.g., via a remote location) through the SNMP protocol. For additional details of management process, see incorporated U.S. patent application Ser. No. 09/326,238.

The control data object 32 is utilized to manipulate control data that is forwarded between the control plane 20 and the forwarding plane 26. More particularly, as known in the art, control data controls data packet processing by the forwarding plane 20. For example, control data may include router table update information, virtual local area network ("VLAN") table data, etc . . . As noted above and known in the art, control data may be generated by control plane application programs 14, and forwarded to the forwarding plane 20 for storage in memory of some data packet processing apparatus.

Three objects directly inherit from the control data object 32 to permit applications to store control data in the forwarding plane 20. Each of these three objects and/or their descendent objects, are coordinated to permit an application program 14 to write control data to, or read control data from, memory 21 used by the control plane (referred to as "memory 21" or "control plane memory 21"). A first of those objects, shown in FIG. 4 as a region object 36, defines the maximum amount of the control plane memory 21 that may be allocated for storing (or reading) a specified type of control data. Although such memory 21 may be physically located in any location, it should be easily accessible by the control plane 20. Accordingly, such memory 21 preferably is located in the control plane 20. Alternatively, such memory 21 may be located in a memory device that is external to the router 12, or even in the forwarding plane.

As an example, if an Internet Protocol application ("IP application") is to update an Internet Protocol routing table, then a preselected amount of memory 21 is allocated by the region object 36 for storing such routing table data. As discussed below, a region object (on a lower level of abstraction) directed to IP will be utilized instead of the region object 36. By permitting a maximum amount of memory for such data, the region object 36 ensures that the IP application does not reserve an unnecessarily large amount of memory for its control data. As known by those in the art, reserving too much memory can cause the router 12 to malfunction. Accordingly, the region object 36 adds some degree of stability to the underlying routing platform.

A mapping object 38, which is a second of the objects to directly inherit from the control data object 32, defines the specific unit of data that is to be written to (or read from) the memory 21 by the application program 14. This unit of data is referred to herein as a "mapping." Continuing with the immediately preceding example, the unit of data to be stored in the routing table by the IP application is a routing table entry. Accordingly, data is written to, or read from, the routing table in units of routing table entries. In addition, the mapping object 38 may have further functionality, such as the capability of providing the current amount of memory 21 utilized for a specified type of data (e.g., the size of a specified routing table), and various notification functions.

A handle object 40, which is a third of the objects to directly inherit from the control data object 32, permits control plane application programs 14 to either read from, or both read from and write to, the control plane memory 21. Accordingly, the handle object 40 is comprised of an author object 42 that permits the application program 14 to both read from and write to a specified location in the control plane memory 21, and a reader object 44 that permits the application program 14 to only read from the specified memory location in control plane memory 21. An application program 14 that can both write to and read from a specified memory location is referred to as an author application program, while an application program 14 that can only read from a specified memory location is referred to as a reader application program.

In preferred embodiments, each memory location can have no more than one author application program, and a plurality of reader programs. Permitting no more than one author application program per memory location adds stability to the system. Specifically, among other benefits, permitting no more than one application program 14 per memory location prevents two applications from potentially adding conflicting data to a specified memory location, and ensures that the lines of data are clean (i.e., not stale).

There are times when an application program 14 cannot add a mapping entry to the control plane memory 21. For example, the mapping may not conform to the data expected for the specified region of the control plane memory 21, an equivalent mapping already may exist at that location, or the maximum amount of data allocated by the region object 36 may have been met.

A mapping may be removed from a specified memory location by several different operations. Specifically, a mapping may be removed if the author application program performs an explicit remove operation to remove the mapping from memory. In addition, a mapping may be removed if it is set with a time limit (referred to in the art as a "timeout") that expires, or if the specified memory location is reset.

The tree includes a plurality of additional levels of abstraction that inherit from the various discussed objects. FIG. 4 shows two types of such levels, both of which can inherit from each other, or independently inherit from other levels (e.g., the above discussed levels). In illustrative embodiments, each level is dedicated to a plurality of protocols on respective layers of a protocol stack. One exemplary generic protocol stack is known in the art as the OSI (open systems interconnection) protocol stack, which has seven defined layers.

One of the levels of abstraction ("network level") preferably has objects for network layer protocols (e.g., Internet Protocol, or Address Resolution Protocol), while the other level ("link level") has objects for link layer protocols (e.g., Asynchronous Transfer Mode, or Virtual Local Area Network protocols). In FIG. 4, each level schematically is shown as a deck of cards (identified by reference number 46), where each card (identified by reference number 48) in its respective deck 46 includes objects for one protocol. FIG. 4 shows an exemplary Internet Protocol card 48 on a network level deck 46, and an exemplary Virtual Local Area Network ("VLAN") card 48 on a link level deck 46.

In accordance with illustrative embodiments, the Internet Protocol card 48 includes a plurality of objects for implementing Internet Protocol control data processing functions (e.g., storing control data, such as routing data, in a routing table in the control plane memory 21). Accordingly, the Internet Protocol card 48 includes an object corresponding to each of the above three discussed objects that inherit from the root control data object 32. Specifically, the Internet Protocol ("IP") card 48 includes an IPRout region object 50 for implementing an IP specific region object 36, an IPRout mapping object 52 for implementing an IP specific mapping object 38, an IPRout author object 54 for implementing an IP specific author object 42, and an IPRout reader 56 object for implementing an IP specific reader object 44. Additional IP objects can be added or deleted from the IP card, as necessary. Such additional IP objects can either or both inherit from other objects, or be root objects for use by other child objects.

In a similar manner, the VLAN card 48 includes a plurality of objects for implementing VLAN control data processing functions. Accordingly, the VLAN card 48 includes a VLAN region object 58, a VLAN mapping object 60, a VLAN author object 62, and a VLAN reader object 64. In addition, as shown by example in FIG. 4, one of the objects on one card 48 can inherit from an object on another card 48. In particular, an IPRout+VLAN mapping object 69 is shown, which inherits from the IPRout mapping object 52.

In illustrative embodiments, each object is configured to comply with the underlying routing platform. Accordingly, if the underlying routing platform is an ACCELAR™ router, distributed by Nortel Networks Corporation of Montreal, Quebec, Canada, each of the objects are configured to operate in accord with the underlying ACCELAR™ hardware and software requirements.

In illustrative embodiments, new objects may be added to the tree as new functionality is developed. Complying with conventional object oriented programming techniques, existing objects are reused to implement the new objects. This results in a growing tree that may have continued functional growth. Moreover, as noted below with reference to FIG. 6, objects in the tree 16 are instantiated by an application program 14 in the control plane to add control data to, or read control data from, control plane memory 21. Instantiated objects are maintained until no longer necessary, or upon expiration of a preset time interval (e.g., a timeout). As known in the art, objects are deleted by executing a destruct function of the object, thus "destructing" the object.

Identified below as "HEADER 1" is a generic class header that may be utilized by illustrative embodiments for objects of all abstraction levels.

| HEADER 1 | |
|---|---|
| Types | |
| FEM_return_t | Signed return code from the FEM API |
| FEM_<name>class: | |
| Fields summary | |
| public int foo; | |
| protected char *bar; | |
| Constructor summary | |
| FEM_<name>(int arg1, char *arg2) | |
| Methods summary | |
| public FEM_return_t | method(arg1,OUT*arg2_) |
| | Short method description |
| | (arg2 is being returned). |
| . . . | . . . |
| . . . | . . . |

Illustrative embodiments, shown below, follow the generic format shown by HEADER 1. Accordingly, below are exemplary class headers for the region object 36, the author object 42, reader object 44, and mapping object 38, and related type information. Each of these objects can be abstracted to a lower level of abstraction to operate with the link layer and network layer decks 46 and their descendent objects.

I. Primitive Types

| Primitive Types | | |
|---|---|---|
| FEM_return_t | Signed return code from the FEM API | sizeof is platform-dependent |
| FEM_event_t | The enum of mapping events (i.e., modification, deletion, reset) for which a notification is served to registered Reader applications | sizeof is platform-dependent |
| FEM_type_t | The enum of the types of mapping | sizeof is platform-dependent |
| FEM_mode_t | Two types of capability are defined: FEM_Reader and FEM_Author | sizeof is platform-dependent |
| FEM_ticket_t | A "hint" that is being returned by the FEM upon successful write operations and can be reused for further write or remove operations of the same mapping for increased efficiency | sizeof is platform-dependent |
| u_bit8_t | general purpose | Unsigned 8 bits |
| u_bit16_t | general purpose | Unsigned 16 bits |
| u_bit32_t | general purpose | Unsigned 32 bits |
| time_t | relative time in milliseconds | Unsigned 32 bits |

II. Complex Types

| Complex Types | |
|---|---|
| MappingList | A STL linked list of FEM_Mapping objects (or derived classes). It is defined as: typedeflist<FEM_Mapping*> MappingList; |

III. The FEM_Region Class

Objects instantiated from the FEM_Region Class (i.e., region objects 36 of FIG. 4) do not export any methods or functions that can be called directly from an application program 14. Accordingly, all methods in this class are called either by the author or reader objects 42 and 44. The author and reader objects 42 and 44 therefore have privileged interaction with the FEM_Region class objects

| Fields summary | |
|---|---|
| protected | current |
| u_bit32_t | How many mappings were stored in this FEM_Region when the method was invoked. |
| Constructor/Destructor summary | |
| protected | FEM_Region (char *name, FEM_type_t t) |
| | Constructs a handle to a FEM_Region specified by name and type. It is meant to be called by mapping- specific sub-classes and friends. |
| protected | ~FEM_Region( ) |
| virtual | Destructor |
| Methods summary | |
| protected static FEM_return_t | lookupRegion (char* name, FEM_type_t type, OUT FEM_Regionr) Create a FEM_Region handle for a FEM_Region with given name and type. The handle is returned as a FEM_Region. Returns: FEM_NOTFOUND-The region with that name and type does not exist. FEM_SUCCESS-Otherwise |
| protected char* | _getName( ) const Returns the name of the FEM_Region. |
| protected FEM_type_t | _getType( ) const Returns the type of mappings stored in this FEM_Region (see Appendix A). |
| protected u_bit32_t | _getCount( ) const Returns the number of mappings stored in this FEM_Region at the time the method was invoked. |
| protected u_bit32_t | _getRoom( ) const At the time this method was invoked, these many mappings could be stored in this FEM_Region before hitting the maximum quota limit. |
| protected FEM_return_t | _sbreak(u_bit32_t howmany) Requests the FEM to increase the quota for this FEM_Region of how many entries. Returns: FEM_ENOSPACE-Not enough resources to extend the FEM_Region FEM_SUCCESS-Otherwise |
| protected FEM_return_t | -requestAsynNotification(FEM_Callback *cb) The calling application will have the handleEvent( ) method of the object FEM_Callback (or derivated objects) called upon the specified event (see Appendix B) happening on this region. The event type is contained within the FEM_Callback object passed as the argument. Returns: FEM_NOSUPPORT-The event is not supported by the FEM implementation FEM_SUCCESS-Otherwise |
| protected void | _cancelAsynNotification(FEM_Callback *cb) Undo a former _requestAsynNotification for a FEM_Callback. |

IV. The FEM_Mapping Class

The FEM_Mapping class implements the mapping object 38 shown in FIG. 4.

| | Field summary |
|---|---|
| protected FEM_Author* | author<br>The FEM_Author who wrote this mapping, if any. |
| protected void* | extension<br>Platform dependent routines may use this Mapping extension to store a pointer to machine-specific compiled mapping data. It is not meant to be visible to FEM_Reader or FEM-Author applications (i.e., derived classes will have private methods that manipulate this). |
| | Constructor/Destructor summary |
| protected | FEM_Mapping(FEM_type_t)<br>Constructs a FEM_Mapping of type t |
| protected virtual | ~FEM_Mapping()<br>Destructor |
| | Method summary |
| public FEM_type_t | getType() const<br>Returns the type of this mapping. |
| public char | getVersion() const<br>Returns the version number of a mapping. |
| public void | setAge(timespec_t time)<br>This mapping will be aged out when relative time expires. |
| public void | setFinalization(FEM_Author *m)<br>When deleted, this mapping will be automatically removed from the FEM using the FEM_Author capability passed in as argument. |
| public bool | isSetFinalized()<br>Was this FEM_Mapping set to be finalized by a former setFinalization() call? |
| public virtual bool | isEquivalent(FEM_Mapping *that) = 0<br>Returns true if that Mapping is equivalent to this Mapping according to some mapping-specific rules. |
| public virtual bool | prettyPrint() const = 0<br>Pretty print the mapping. |

V. The FEM_Author Class

The FEM_Author class implements author object 42 shown in FIG. 4.

FEM_Author class: public virtual FEM_Reader

| | Fields summary |
|---|---|
| None exported. | |
| | Constructor/Destructor summary |
| protected | FEM_Author(FEM_Region *r,<br>OUT FEM_return_t *error)<br>Constructs a FEM_Author handle to a FEM_Region. It is meant to be called by mapping-specific sub-classes and friends. Error conditions are signaled through the error OUT argument as follows.<br>FEM_INVALID_ARGUMENT-The region is not valid<br>FEM_NOPERMISSION-The caller is not entitled to have FEM_Author privilege<br>FEM_SUCCESS-Otherwise |
| protected virtual | ~FEM_Author()<br>Destructor |
| | Methods summary |
| public u_bit32_t | getCount() const<br>Return the number of mappings that are active within this FEM_Region. |
| public u_bit32_t | getRoom() const<br>How far is this FEM_Region from the current maximum quota?<br>Number of mappings is returned. |

-continued

| | |
|---|---|
| public | sbreak(u_int32_t howmany) |
| FEM_return_t | Requests the FEM to increase the quota for this FEM_Region of these many entries. The number of requested entries may be changed or denied all together by FEM.<br>Returns:<br>FEM_ENOSPACE-Not enough resources to extend the FEM_Region<br>FEM_SUCCESS-Otherwise |

VI. The FEM_Reader Class

The FEM_Reader Class implements the reader object 44 shown in FIG. 4.

| | Fields summary |
|---|---|
| protected FEM_Region* | region<br>The pointer to the FEM_Region for this FEM_Reader. |
| | Constructor/Destructor summary |
| protected | FEM_Reader(FEM_Region *r,OUT FEM_return_t *error)<br>Constructs a FEM_Reader handle to a FEM_Region. It is meant to be called by mapping-specific sub-classes and friends. Error conditions are signaled through the error OUT argument as follows.<br>FEM_INVALID_ARGUMENT-The region is not valid.<br>FEM_SUCCESS-Otherwise. |
| protected virtual | ~FEM_Reader()<br>Destructor |
| | Methods summary |
| public char* | getName() const<br>Return the name associated with a FEM_Region. |
| public FEM_type_t | getType() const<br>Return the type of mappings stored in this FEM_Region. |
| protected FEM_return_t | requestAsynNotification(FEM_Callback *cb)<br>The calling application will have the handleEvent() method of the object FEMCallback (or derived objects) called upon the specified event happening on this region.<br>Returns:<br>FEM_NOSUPPORT-The event is not supported by the FEM implementation<br>FEM_SUCCESS-Otherwise |
| protected void | cancelAsynNotification(FEM_Callback *cb)<br>Undo a former _requestAsynNotification for a FEM_Callback. |

Figure 5:
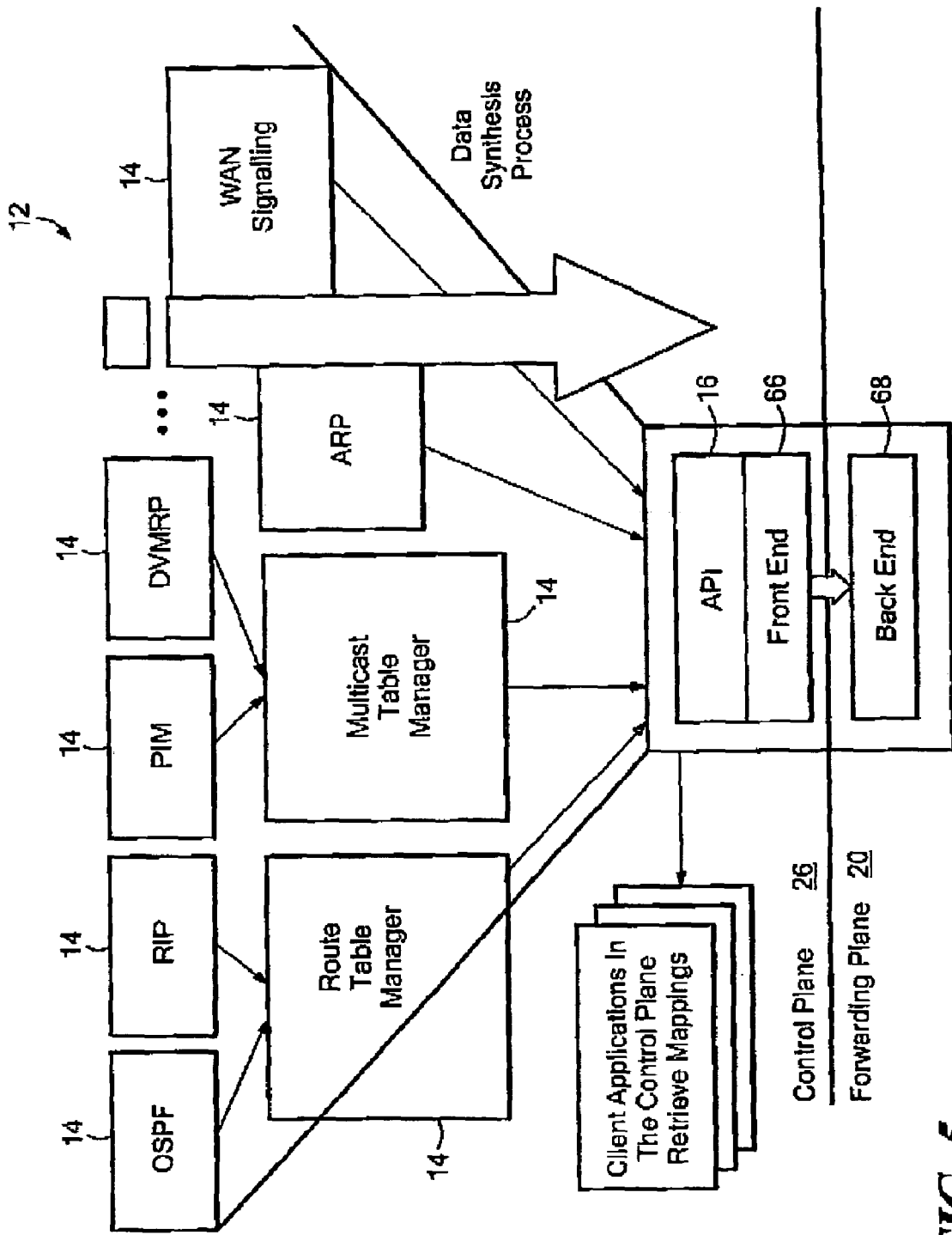
FIG. 5 schematically shows a specific implementation of a router that utilizes illustrative embodiments of the invention.

FIG. 5 schematically shows a specific implementation of a router 12 utilizing illustrative embodiments of the invention. Specifically, the router 12 includes the control plane 26 having the plurality of application programs 14, and the forwarding plane 20. In addition to the application programs 14, the control plane 26 also includes the API 16, and a front end 66 for forwarding control data (i.e., "pushing control data") from the API 16. Among other things, the front end 66 processes the control data into a format that is platform dependent for receipt by a back end 68 in the forwarding plane 20 (discussed below).

The back end 68 receives control data from the front end 66. In particular, control data stored in memory 21 is processed as noted above, and then forwarded to the back end 68. Such data may be stored in local routing tables in the forwarding plane 20. Although one back end 68 is shown, in illustrative embodiments, the forwarding plane 20 includes a plurality of back ends 68 for receiving control data from a single front end 66. For example, each of a plurality of back ends 68 may perform forwarding plane functions for one of a plurality of ports on the router 12. In other embodiments, two front ends 66 may forward control data to a plurality of back ends 68. Generally, a plurality of front ends 66 can be utilized to cooperate with a plurality of back ends 68.

It should be noted that the application programs 14 shown are a non-exhaustive listing of protocol implementations that may be found in the control plane 26. For example, the WAN Signaling application program stores and retrieves correspondence between IP addresses and phone numbers from the API 16.

The tree structure shown in FIG. 4 preferably is entirely contained within the API block 16 shown in FIG. 5. Accordingly, each of the application programs 14 are platform independent and thus, forward platform independent commands to the API 16. Upon receipt of control data, the API 16 forwards the data to the front end 66. The front end 66 responsively determines which back end(s) 68 is/are to receive the control data, and then forwards the received control data to the appropriate back end(s) 68.

In addition to being stored by the application programs 14, control data in the control plane 20 can be read by the application programs 14 via the API 16. In fact, application programs 14 can share control data through the API 16. For example, the router table manager application program 14 may store control data in the memory 21, which subsequently can be retrieved by the multicast table manager application program 14. Moreover, retrieved control data can be utilized for a variety of purposes. For example, if an application program 14 malfunctions (i.e., "crashes"), stored control data in the memory 21 can be accessed for use upon a subsequent restart of the malfunctioning application program 14.

Figure 6:
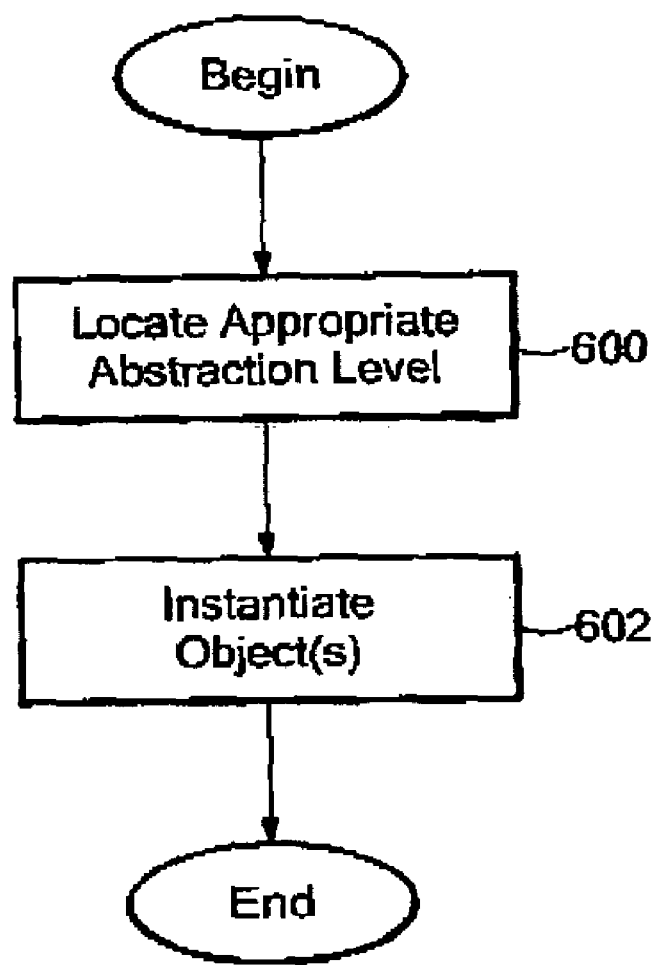
FIG. 6 shows an exemplary process utilized by an application program to store control data in, or retrieve control data from, the forwarding plane shown in FIGS. 2, 3 and 5.

FIG. 6 shows an exemplary process utilized by an application program 14 to store control data in, or retrieve control data from, the memory 21. The process begins at step 600, in which the appropriate level of abstraction is located. Once the appropriate level of abstraction is located, then the appropriate objects are instantiated (step 602). To that end, the class header(s) for the appropriate object(s) are located. Appropriate commands, based upon the class header(s), then are forwarded to the API 16. Upon receipt by an input of the API 16, the appropriate objects are instantiated and used to forward control data to, or retrieve control data from, the memory 21. Data then may be forwarded to the appropriate back end 68, as necessary. In some embodiments, the front end 66 effectively may be considered an output for the API 16 for forwarding data to the back end 68.

Some embodiments of the invention may be implemented in any conventional computer programming language. For example, preferred embodiments may be implemented in a procedural programming language (e.g., C) or an object oriented programming language (e.g., C++ or JAVA). Alternative embodiments of the invention may be implemented as preprogrammed hardware elements (e.g., application specific integrated circuits and digital signal processors, as discussed), or other related components.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions preferably embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various exemplary embodiments of the invention are disclosed below, it should be apparent to those skilled in the art that various changes and modifications can be made which will achieve some of the advantages of the invention without departing from the true scope of the invention. These and other obvious modifications are intended to be covered by the claims and appendix that follows:

We claim:

1. An application programming interface to a forwarding plane for processing data packets in a network device that forwards packets across a network, the application programming interface comprising:

an input module that receives routing platform independent function calls, wherein the function calls include routing platform independent input control data, and wherein the routing platform independent input control data includes table data to update a routing table;

at least one control module that receives the input control data via the function calls, the at least one control module producing routing platform specific output control data based upon the input control data, the output control data being capable of controlling execution of the forwarding plane, wherein the at least one control module comprises a plurality of objects arranged in a hierarchical tree structure, the function calls instantiating at least one of the objects for storing the output control data in a memory device, and wherein the at least one control module includes a region module that identifies a specified amount of memory for storing the output control data; and an output module that forwards the output control data from the at least one control module.

2. The application programming interface as defined by claim 1 wherein the at least one control module includes:

a mapping module that specifies units of the output control data for storage in memory.

3. The application programming interface as defined by claim 1 wherein the at least one control module includes:

a read handler module that permits output control data to be read from memory by an application program.

4. The application programming interface as defined by claim 1 wherein the at least one control module includes:

a write handler module that permits the output control data to be written to memory by an application program.

5. The application programming interface as defined by claim 4 wherein the write handler module permits the output control data to be modified in memory by the application program.

6. The application programming interface as defined by claim 1 wherein the network device is a router.

7. An application programming interface to a forwarding plane for processing data packets in a network device that forwards data packets across a network, the application programming interface comprising:

a hierarchical tree of objects that control execution of the forwarding plane, wherein the tree of objects includes a region object that identifies a specified amount of memory for storing control data, each of the objects being responsive to routing platform independent function calls from an application program, wherein the function calls include routing platform independent input control data, and wherein the routing platform independent input control data includes table data to update a routing table, each of the objects producing routing platform specific control data, based upon the input control data in the function calls, to control execution of the forwarding plane, and wherein at least one of the objects arranged in a hierarchical tree structure are capable of being instantiated by the function calls from the application program, producing the control data, and storing the control data in a memory.

8. The application programming interface as defined by claim 7 wherein the application program instantiates the at least one of the objects by forwarding a given function call having an instantiation message to class code for one of the objects, the given function call having given data to be stored in the memory.

9. The application programming interface as defined by claim 7 wherein the tree of objects includes:

a mapping object that specifies units of the control data for storage in memory.

10. The application programming interface as defined by claim 7 wherein the tree of objects includes:

a read handler object that permits control data to be read from memory by the application program.

11. The application programming interface as defined by claim 7 wherein the tree of objects includes:

a write handler object that permits the control data to be written to memory by the application program.

12. The application programming interface as defined by claim 11 wherein the write handler object permits the control data to be modified in memory by the application program.

13. The application programming interface as defined by claim 7 wherein the network device includes a router.

14. A computer program product, the computer program product having a computer readable medium with computer program code for providing an application programming interface to a forwarding plane for processing packets in a network device that forwards data packets across a network thereon, the computer program product comprising:

program code for instantiating a hierarchical tree of objects that control execution of the forwarding plane wherein the tree of objects includes a region object that identifies a specified amount of memory for storing control data, each of the objects having program code that is responsive to routing platform independent function calls from an application program, wherein the function calls include routing platform independent input control data, and wherein the routing platform independent input control data includes table data to update a routing table, each of the objects having program code for producing routing platform specific control data, based upon the input control data in the function calls, to control execution of the forwarding plane, and wherein one of the objects has program code for instantiating in response to function calls from the application program, the one of the objects producing given control data, the one of the objects storing the given control data in memory.

15. The computer program product as defined by claim 14 wherein the application program instantiates the one of the objects by forwarding a given function call having an instantiation message to class code for the one of the objects, the given function call having given data to be stored in memory.

16. A network device having an application programming interface to a forwarding plane that processes data packets for forwarding across a network, the network device being capable of executing an application program that produces function calls, the network device comprising:

a processor for executing the application program;

the application programming interface having a control module that controls the forwarding plane in response to at least one routing platform independent function call from the application program, wherein the control module produces routing platform specific control data responsive to routing platform independent input control data in the at least one function call from the application program, wherein the routing platform independent input control data includes table data to update a routing table, wherein the control module includes a region module that identifies a specified amount of memory for storing control data for controlling the forwarding plane; and wherein the control module comprises a plurality of objects arranged in a hierarchical tree structure, the at least one function call instantiating at least one of the objects for generating control data that controls the forwarding plane.

17. The network device as defined by claim 16 wherein the control module includes:

a mapping module that specifies units of control data for storage in memory, the control data controlling the forwarding plane.

18. The network device as defined by claim 16 wherein the control module includes:

a read handler module that permits control data to be read from memory by the application program, the control data controlling the forwarding plane.

19. The network device as defined by claim 16 wherein the control module includes:

a write handler module that permits control data to be written to memory by the application program, the control data controlling the forwarding plane.

20. The network device as defined by claim 19 wherein the write handler module permits the control data to be modified in memory by the application program.

21. The network device as defined by claim 16 further including a router.

22. An application programming interface to a forwarding plane for processing data packets in a network device that forwards data packets across a network, the application programming interface comprising:

a control module that receives routing platform independent input control data from routing platform independent function calls from an application program, wherein the routing platform independent input control data includes table data to update a routing table, the control module producing routing platform specific control data for use by the forwarding plane responsive to the input control data received in the function calls from the application program, the forwarding plane processing the data packets as specified by the control data;

a management module that receives management data for managing the forwarding plane;

wherein the control module includes a plurality of submodules that form a hierarchical tree structure for processing the control data; and wherein the control module includes a region module that identifies a specified amount of memory for storing the control data for controlling the forwarding plane.

23. The application programming interface as defined by claim 22 wherein the submodules include objects formed in accord with object oriented programming principles.

24. The application programming interface as defined by claim 22 wherein the control data is received from a control plane that is a part of the network device.

25. The application programming interface as defined by claim 22 wherein the network device includes a router.

* * * * *